United States Patent [19]
Ikuse et al.

[11] Patent Number: 5,749,321
[45] Date of Patent: May 12, 1998

[54] ANIMAL REARING APPARATUS

[75] Inventors: Toshimi Ikuse, Nara; Mitsuhiro Nishiwaki, Kobe; Tamotsu Yonekura, Sakai; Kaoru Nakamura, Nakagyo-ku; Yoshinori Watatani; Mamoru Ueshiba, both of Osaka, all of Japan

[73] Assignee: Santen Seiyaku Kabushiki Kaisha, Osaka, Japan

[21] Appl. No.: 651,738

[22] Filed: May 22, 1996

[30] Foreign Application Priority Data

May 24, 1995 [JP] Japan ..................... 7-125018

[51] Int. Cl.$^6$ ..................... A01K 1/00; A01K 31/04
[52] U.S. Cl. ..................... 119/458; 119/456; 119/479
[58] Field of Search ..................... 119/458, 452, 119/417, 418, 419, 455, 456, 473, 474, 479, 480

[56] References Cited

U.S. PATENT DOCUMENTS

| 4,016,833 | 4/1977 | Ray | 119/498 |
| 4,869,206 | 9/1989 | Spina | 119/417 |

FOREIGN PATENT DOCUMENTS

| 2127369 | 12/1972 | Germany | A01K 1/02 |
| 63-25981 | 7/1988 | Japan | |
| 63-43898 | 11/1988 | Japan | |

*Primary Examiner*—Michael J. Carone
*Assistant Examiner*—Yvonne R. Abbott
*Attorney, Agent, or Firm*—Webb Ziesenheim Bruening Logsdon Orkin & Hanson, P.C.

[57] ABSTRACT

An animal rearing apparatus includes an animal rearing cage and a framework to which a plurality of side plates together forming the periphery of the animal rearing cage are detachably attached. At the bottom of the animal rearing cage, there are provided a bottom plate detachably attached thereto and defining a plurality of openings vertically extending therethrough and an excreta collecting portion for receiving and collecting animal excreta dropped through the openings of the bottom plate. The animal rearing cage has a ceiling thereof sectioned by a top plate or the excreta collecting portion belonging to an animal rearing cage on the upper stage. The framework or an attachment member thereof includes, at portions thereof corresponding in level to the ceiling of the animal rearing cage, engaging portions for detachably engaging and suspending engaged portions provided at upper portions of the respective side plates.

11 Claims, 13 Drawing Sheets

ANIMAL REARING APPARATUS

BACKGROUND OF THE INVENTION

1. Field of the Invention

The present invention relates to an animal rearing apparatus for use in rearing laboratory animals such as rabbits, guinea pigs or the like. More particularly, the invention relates to an animal rearing apparatus including a plurality of side plates detachably attached to a framework for sectioning the inside of the frame into a plurality of animal rearing cages, a bottom plate detachably disposed at the bottom of each cage and defining a plurality of openings vertically extending therethrough, an excreta collecting portion for receiving and collecting excreta of animals dropped through the openings of the bottom plate, and a top plate attached to the top side of the framework. Either the top plate or the excreta collecting portion provided at an uppermost stage of the framework defines the top or ceiling section of the animal rearing cage.

2. Description of the Related Art

As sanitariness is required of a laboratory animal rearing cage, a cleaning/sterilizing operation is usually needed when the animals are replaced. Further, for allowing such cleaning/sterilizing operation needed in the case of e.g. replacement of the animals, another cage should be prepared as a spare. With the conventional box type animal rearing apparatus commonly employed, the cleaning/sterilizing operation is troublesome and a large space is needed for its storage. Then, there has been a continuous demand for an assembly or disassemblable type animal rearing cage which allows facilitation of the cleaning/sterilizing operation and reduction of the storage space.

To cope with the above demand, the prior art has suggested two types of animal rearing apparatuses (a), (b) as follow.

(a) One type of conventional animal rearing apparatus is as shown in FIG. 13. In this apparatus, at each adjacent side edge of metal side plates 50 together forming the periphery of an animal rearing cage S, there are provided connecting cylinders 51 vertically and coaxially disposed relative to each other. Then, the adjacent side plates 50 are joined to each other by removably inserting, from the above, a connecting pin 52 into the connecting cylinders of these respective adjacent side plates 50. Further, a rectangular reinforcing frame 54 formed of metal is detachably engaged with L-shaped engaging elements 53 provided at upper portions on the inner faces of the respective side plates 50, thereby to prevent inadvertent upward withdrawal of the connecting pins 52 inserted into the respective connecting cylinders 51. Also, upper ends of the side plates opposed to each other in the right and left directions are bent outwards to provide support elements 55 to be withdrawably inserted into an unillustrated framework along the front-rear direction.

A lower end 50a of each side plate 50a is bent inwards, i.e. into the animal rearing cage S, so that a bottom mesh or grid plate 56 formed of metal may be placed and supported on these bent lower ends 50a of the side plates 50 (e.g. Japanese examined utility model publication gazette No. 63-25981). (b) The other type of conventional animal rearing apparatus is as shown in FIG. 14. The apparatus includes a framework 60 capable of forming therein a plurality of animal rearing cages S sectioned from one another. This framework 60 is constructed from four first crosspieces 60A extending parallel to each other in the right and left directions, four second crosspieces 60B extending parallel to each other in the front-rear direction, and from four vertical corner posts 60C. Further, guide members 64 are fixedly attached to and between the two upper first crosspieces 60A and between the two lower first crosspieces 60A, respectively. The animal rearing cage S is sectioned by being surrounded by a front side plate 61, a rear side plate 62 and left and right side plates 63. Each of the guide members 64 has a guide slot 64 a into which the left or right side plate 63 is guided and inserted from the front-rear direction. To the bottom side of each lower guide member 64, there is fixedly attached a support plate 65 for supporting, from the under, the side plate 63 inserted to a predetermined position inside the guide slot 64 a.

A receiver plate 67 is fixedly attached to each of the upper guide members 64 onto which a top plate 66 is inserted in the forward or rearward direction to be supported thereon. The rear lower first crosspiece 60A defines plural pairs of inserting holes 60 a for receiving a pair of right and left tongues 62a formed at the lower edge of each rear side plate 62.

Further, the top plate 66 includes, adjacent a rear edge thereof, a pair of downwardly projecting supporting tongues 66a for coming into contact with and receiving the upper end of the rear side plate 62.

Further, an engaging support plate 70 is fixedly attached to the lower guide member 64, on which plate 70 there are engaged and placed, one above the other, a metal bottom grid 68 and a grid frame 69 for guiding dropped animal excreta. To a front edge of one side plate 63, there is detachably and pivotably attached the front plate 61. (For further details of this construction, see e.g. Japanese examined utility model publication gazette No. 63-43898).

With the above-described conventional animal rearing apparatuses, the plural side plates forming the periphery of the animal rearing cage S and the bottom plates are rendered detachable from the apparatus bodies. Therefore, in comparison with further constructions in which the side plates are formed integral with the apparatus body or these side plates are rendered foldable relative thereto, the above-described conventionally proposed constructions allow a complete cleaning/sterilizing operation of these side plates and bottom plates for completely removing animal excreta or residues of animal feeds when such operation is required in association with replacement of the animals to be reared therein. However, with these conventional apparatuses, there still remains room for improvement in the following respects.

Namely, in the case of the former type of conventional apparatus, in addition to the plural side plates 50, the construction further requires the plural connecting pins 52 for interconnecting the adjacent side plates 50 and the rectangular reinforcing frames 54 for preventing inadvertent upward withdrawal of the connecting pins 52. In this way, this constructions requires a great number of members which render troublesome the assembly/disassembly operations thereof as well as their cleaning/sterilizing operation.

Moreover, the plural side plates 50 are assembled in advance into a box-like construction by means of the connecting pins 52 and the reinforcing frames 54 with the bottom plate 56 being placed and supported on and between the lower ends 50 a of the opposing side plates and then this box-like construction is assembled with the framework. Thus, if there arises necessity of detaching and cleaning/sterilizing only the bottom plate 56 which tends to be soiled sooner than the other apparatus members, the detaching operation of this bottom plate 56 requires great trouble involving plural steps, i.e. the step of withdrawing the box-like construction from the framework, the step of disengaging the reinforcing frame 54 from the engaging elements 53 of the respective side plates 50, and the further step of withdrawing the connecting pins 52 interconnecting the adjacent side plates 50.

Furthermore, as the plural side plates 50 are heavy as being formed of metal material, handling of these side plates requires significant amount of work which tends to lead to deterioration in the efficiency of the assembly/disassembly operation as well as the cleaning/sterilizing operation.

In the case of the latter type of conventional animal rearing apparatus, the framework 60 integrally includes the support portions for respectively supporting the rear plate 62, the right and left side plates 63 and the bottom plate 64. Accordingly, in comparison with the above-described former type, this construction has fewer components and therefore its assembly/disassembly operation is easier. However, the rear plate 62 and the right and left side plates 63 are removably assembled to the framework 60, and also the portion of the guide member 64 for receiving and guiding the side plate 63 projects into the animal rearing cage S, animal excreta excreted by the animals at the corners of the animal rearing cage S tend to flow down or run along the guide members 64 and the framework 60 to the other adjacent cage S or to the outside of the apparatus. Moreover, urea calculus tends to be formed at those portions where the lower end of the side plate 63 contacts the support plate 65 and the lower end of the rear plate 62 contacts the first crosspiece 60A of the framework 60, thereby to cause a sanitation problem in the rearing environment. In addition, the cleaning/sterilizing operation of the framework 60 and the side plates 61, 62, 63 after the disassembly thereof is troublesome. In particular, the right and left sides of the support plate 65 coming into contact with and supporting the lower end of the side plate 63 are especially difficult to be cleaned since these portions are surrounded by the guide member 64 forming the inserting guide slot 64a.

The present invention has been made in consideration to the above-described state of the art. A primary object of this invention is to simplify the construction of the animal rearing apparatus through rational modification of the framework and to provide an improved animal rearing apparatus which allows easy and efficient assembly/disassembly operation of the apparatus and also individual detachment of the bottom plate which tends to be soiled soon and which further allows rearing of animals under sanitary environment with restricting generation of urea calculus inside the apparatus.

SUMMARY OF THE INVENTION

For accomplishing the above-noted object, an animal rearing apparatus, according to the present invention, comprises:
 an animal rearing cage;
 a framework to which a plurality of side plates for together forming the periphery of the animal rearing cage are detachably attached;
 wherein, at the bottom of the animal rearing cage, there are provided a bottom plate detachably attached thereto and defining a plurality of openings vertically extending therethrough and an excreta collecting portion for receiving and collecting animal excreta dropped through the openings of the bottom plate, the animal rearing cage having a ceiling thereof sectioned by a top plate or the excreta collecting portion belonging to an animal rearing cage on the upper stage;
 the framework or an attachment member thereof includes, at portions thereof corresponding in level to the ceiling of the animal rearing cage, engaging portions for detachably engaging and suspending engaged portions provided at upper portions of the respective side plates.

With the above-described construction, the engaged portions provided at the upper portions of the respective side plates are detachably engaged with and suspended from the engaged portions provided at the portions of the framework or an attachment member thereof corresponding in level to the ceiling of the animal rearing cage. Accordingly, unlike the conventional constructions, the guide member on which the lower end of the side plate is removably engaged and placed or the crosspiece for receiving and retaining the lower end of the rear plate does not project into the bottom area of the animal rearing cage. Thus, if an animal excretes at an inner corner of the animal rearing cage, the excreta do not run along any side-plate attaching member such as the guide member or the crosspiece to leak to another adjacent animal rearing cage or to the outside of the apparatus. Further, with the above construction, it is possible to minimize such contact areas where urea calculus tends to be formed.

Further, the respective side plates may be readily assembled with and disassembled from the framework or the attachment member thereof. In particular, when there arises the necessity of detaching and cleaning/sterilizing only the bottom plate which tends to be soiled sooner than the other apparatus members, this bottom plate may be readily removed out of the framework through a front opening of the animal rearing cage.

Consequently, during rearing of the animal, the excreta of the animal do not leak into other adjacent animal rearing cage or to the outside of the apparatus. And, the contact areas tending to invite formation of urea calculus may be minimized. Thus, the animals may be reared under sanitary environment and the cleaning/sterilizing operation of the apparatus may be effected in an efficient manner. Also, the individual detachment operation of the bottom plate alone may be readily effected.

According to another aspect of the invention, the framework or the attachment thereof includes a contact restricting portion for restricting, through contact, a pivotal movement of each side plate suspended from the engaging portion in a direction away from the animal rearing cage, and a pivotal movement of the side plate in the opposite direction toward the center of the animal rearing cage is restricted by contact between this side plate and the bottom plate or by contact between the other side plate opposed to said side plate and the bottom plate.

With the above-described construction, the pivotal movement of the side plate suspended from the engaging portion is restricted by means of the contact between this side plate and the bottom plate or by contact between the other side plate opposed to said side plate and the bottom plate. Hence, the construction requires only the plural side plates for together forming and sectioning the periphery of the animal rearing cage and the detachable bottom plate defining a number of openings vertically extending therethrough.

As a result, the desired effect may be obtained simply by providing the framework with the engaging portions for suspending the side plates and the contact restricting portions for restricting the pivotal movements of the respective suspended side plates, so that the construction of the apparatus may be further simplified.

Moreover, the cleaning/sterilizing operation is required of only the side plates and the bottom plate. The construction requires significantly reduced number of components and the assembly/disassembly steps of the components may be fewer accordingly. So that, the disassembly and re-assembly operations and cleaning/sterilizing operation required in association with replacement of animals may be effected even more efficiently.

According to a still further aspect of the invention, each of at least one opposing pair of the side plates includes, at a lower portion thereof, a support portion for detachably supporting the bottom plate thereon.

With the above construction, since the bottom plate is placed and supported on the opposed side plates, only the side plates and the bottom plate require the cleaning/sterilizing operation. Thus, unlike the further construction in which the bottom plate is detachably supported to the framework, the above construction can eliminate the necessity of cleaning/sterilizing the portions of the framework supporting the bottom plate.

As a result, in the cleaning/sterilizing operation of the side plates and the bottom plate, those portions of the framework requiring the cleaning/sterilizing operation may be further reduced in number.

According to a still further aspect of the invention, the entire or at least portions of the respective side plates are formed of synthetic resin material and the engaged portions are formed of metal material.

With the above construction, some portions of or entire side plates are formed of synthetic resin material to achieve weight reduction, while the engaged portions subjected to concentrated load from the weight of the animal and so on is formed of metal material to provide superior strength.

As a result, as the side plates have reduced weight while the durability of the engaged portions of the side plates is improved, the handling of these side plates in the course of assembly/disassembly or cleaning/sterilizing operation thereof may be further facilitated.

According to a still further aspect of the invention, the lower portion of the front side plate is bent toward the animal rearing cage so as to provide the support portion for detachably supporting the bottom plate thereon.

With this construction, a portion of the bottom plate may be placed and supported by utilizing the bent lower portion of the front side plate. In addition, the bent lower portion may advantageously guide any urea fallen onto the front side plate toward the center of the excreta collecting portion.

As a result, there is no necessity of providing the front side plate per se with any special additional element or portion for supporting the bottom plate, so that the construction of the front side plate may be simple. Further, by effectively utilizing this bent construction, the urea may be effectively guided to the appropriate location, whereby the leak preventive effect of the apparatus may be further enhanced.

According to a still further aspect of the invention, the framework includes a plurality of animal rearing cages sectioned from one another at least in lateral direction, and adjacent cages adjacent each other in the lateral direction are sectioned from each other by a single side plate shared by these cages.

With the above-described construction, when a plurality of animal rearing cases are provided and sectioned from one another in the lateral, i.e. the right and left direction within the framework, the laterally adjacent cages are sectioned by means of the single side plate shared by the same. Therefore, the number of the side plates too may be reduced.

As a result, with the reduction in the number of side plates required, the efficiency of the assembly/disassembly operation and cleaning/sterilizing operation needed in association with replacement of the animals may be further improved.

According to a still further aspect of the present invention, the excreta collecting portion is a liquid tank, and the lower end of the respective side plate suspended from the respective engaging portion extends into the liquid tank.

With the above-described construction, the animal excreta or residue of animal feed dropped through the openings of the bottom plate may be received in the liquid tank. Further, if urea is splashed against a side plate, this urea may be guided along this side plate into the liquid tank.

As a result, the animal excreta or residue of animal feed dropped through the openings of the bottom plate may be collected without causing significant odor dispersion thereof. In addition, this construction may prevent leakage of the urea splashed against the side plate even more effectively.

According to a still further aspect of the present invention, the animal rearing apparatus further comprises a cleaning-liquid supply mechanism for supplying cleaning liquid into the liquid tank and a cleaning-liquid exhaust mechanism for exhausting the used liquid from the inside of the liquid tank to the outside.

With the above construction, when the cleaning liquid is exhausted to the outside by the cleaning-liquid exhaust mechanism, the animal excreta, the animal feed residue or the like too may be exhausted from the tank together with the cleaning liquid.

According to a still further aspect of the invention, said each engaged portion provided to the respective side plate is a through hole, while said each engaging portion provided at the position corresponding in level to the ceiling is an engaging projection engageable into the through hole.

With the above construction, in comparison with a further conceivable construction in which the engaged portion of the side plate is provided as a hook-like projection and the engaging portion provided at the position corresponding in level to the ceiling of the animal rearing cage is provided as a through hole, it is possible to reduce the unevenness in the side plate, whereby a hooking trouble of the side plate may be avoided advantageously.

As a result, the efficiency of the cleaning/sterilizing operation of the side plates may be further improved.

According to a still further aspect of the invention, a checking/cleaning opening is provided between the lower end of the front side plate and a side wall of the liquid tank opposing thereto in the front-rear direction, and a lid is detachably attached to the checking/cleaning opening.

With the above construction, by detaching the lid, the inside condition of the liquid tank may be visually checked through the checking/cleaning opening provided between the lower end of the front side plate and the side plate opposing thereto in the forward and rearward directions. A cleaning operation is also possible through this opening.

As a result, it becomes easier to check the inside condition of the liquid tank and to effect the cleaning operation.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of an animal rearing apparatus relating to the present invention will now be described in details with reference to the accompanying drawings.

[first embodiment]

Figure 1:
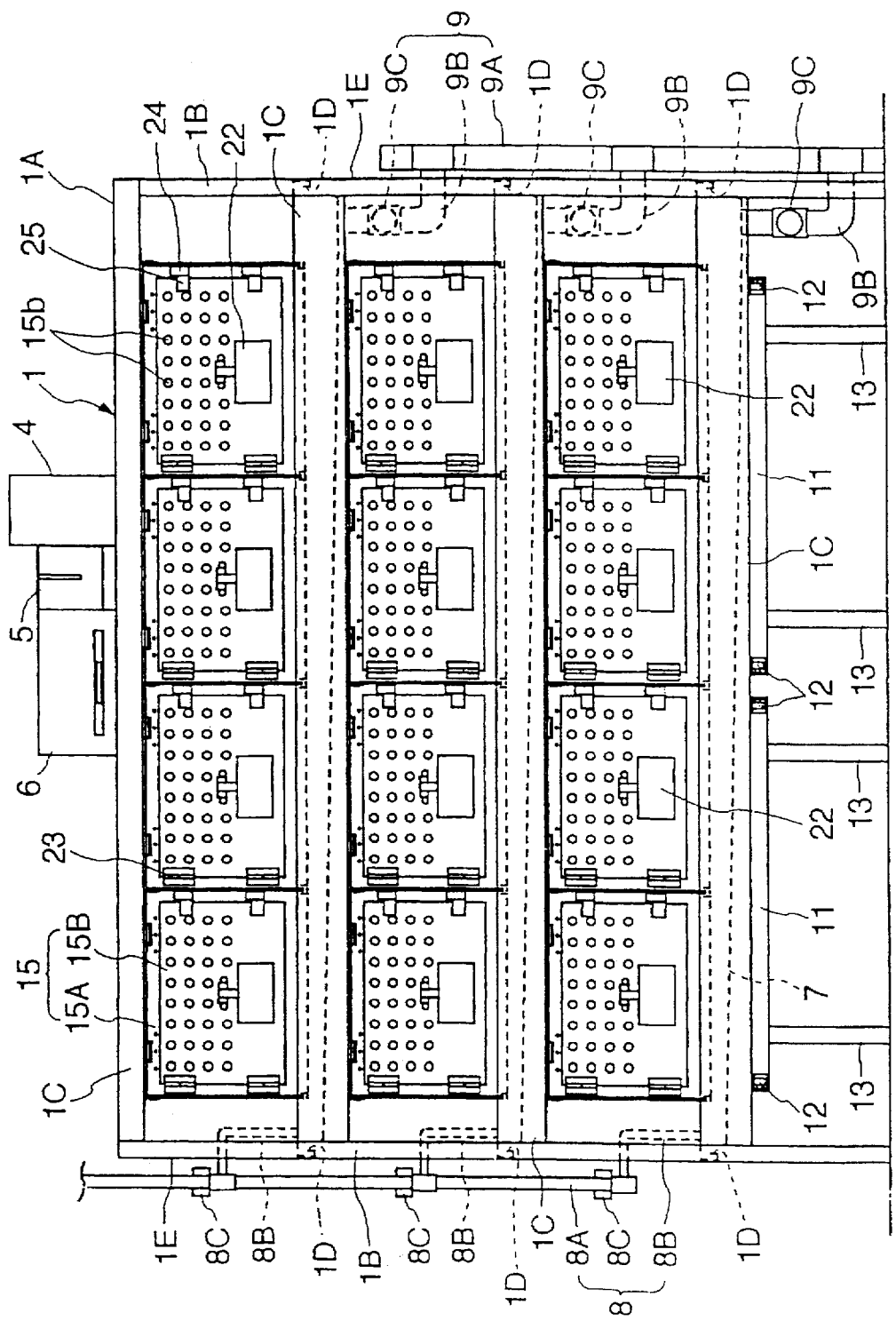
FIG. 1 is a front view showing an entire animal rearing apparatus according to a first preferred embodiment.
Figure 2:
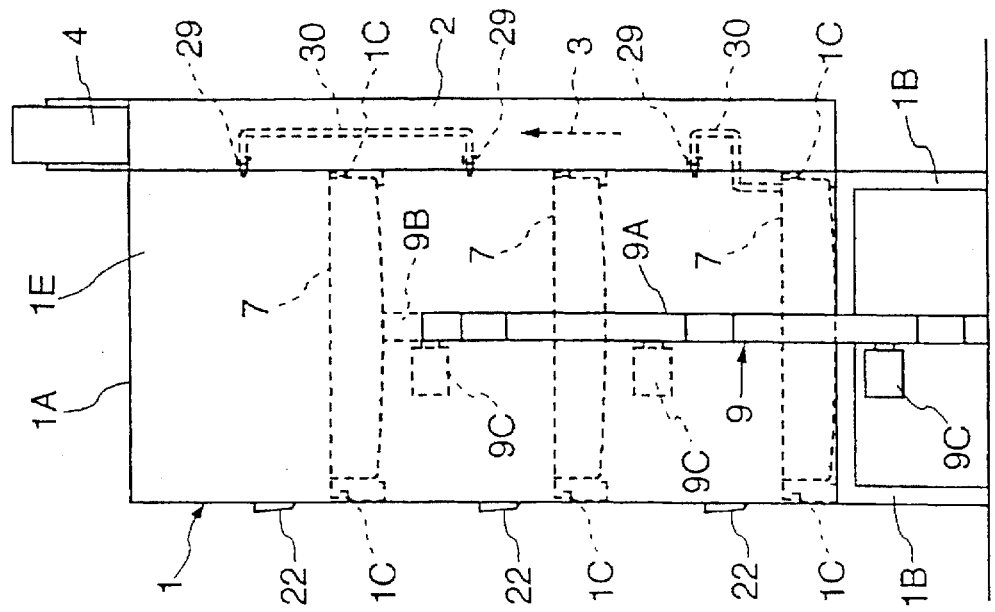
FIG. 2 is a right side view showing the entire animal rearing apparatus.
Figure 3:
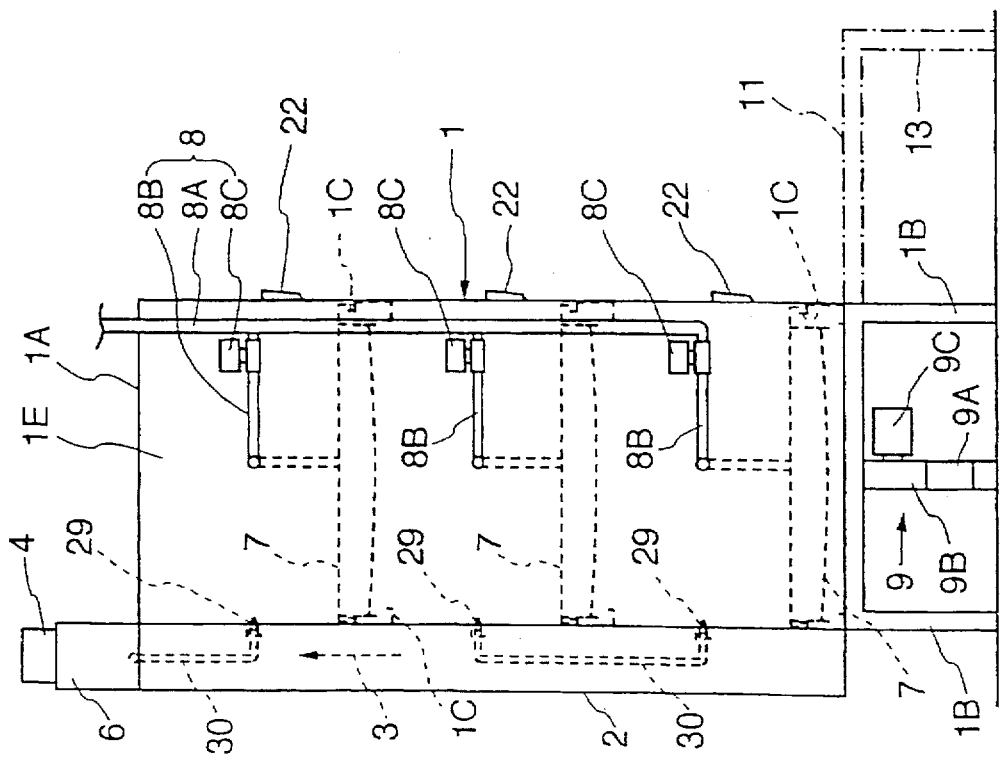
FIG. 3 is a left side view showing the entire animal rearing apparatus.

FIGS. 1 through 3 show an animal rearing apparatus according to a first preferred embodiment. The apparatus includes a framework 1 to be disposed on the ground in which framework a plurality of animal rearing cages S are provided one above another and side by side as being sectioned from each other. To the rear side of the framework 1, there is attached a duct cover 2 communicating with the respective cages S. On a top plate 1A of the framework 1, there are disposed an air-exhaust fan 4 for taking in air in the respective animal rearing cages S through an air exhaust duct 3 inside the duct cover 2, a damper 5 for adjusting the amount of air exhausted by the exhaust fan 4, and a filter box 6 for eliminating dust or the like present in the exhaust air.

The framework 1 includes four corner posts 1B, four first crosspieces 1C extending horizontally at total four levels between the respective pairs of laterally opposed corner posts, and two second crosspieces 1D extending horizontally at total two levels between the respective two pairs of corner posts 1B opposed to each other in the front-rear direction. To the respective lateral sides of the framework 1, there are fixedly attached side plates 1E, and also the top plate 1A is fixedly attached to the top side of the framework.

Of the first crosspieces 1C of the framework 1, between each pair of the first crosspieces 1C belong to the same level, except the uppermost first crosspieces 1C, there are disposed liquid tanks 7 (to be referred to as 'water tank' hereinafter) made of fiber-reinforced plastic (FRP). This tank 7 has a length substantially same as the opposing distance between the corner posts laterally opposed to each other. On one lateral side within the framework 1, there is provided a cleaning-liquid supply mechanism 8 for supplying the respective water tanks 7 with water as an example of cleaning liquid. On the other lateral side within the framework 1, there is provided a liquid exhausting mechanism 9 for exhausting the used cleaning liquid, i.e. the water stored in the respective water tank to the outside together with excreta of animals, residue of animal feed or the like.

Further, of the first crosspieces 1C of the framework 1, guide rails 12 are attached to the lower side of the lowermost first crosspieces 1C. These guide rails 12 support a pair of right and left work tables 11 to be slidable in the front-rear direction. A pair of right and left leg members 13 are foldably attached to the leading ends of each respective work table 11 so as to support this work table 11 when withdrawn forwardly.

The liquid supply mechanism 8 includes a main water supply pipe 8A which extends vertically along the one side plate 1E of the framework 1. At three positions of the main water supply pipe 8A upwardly displaced from the attaching position of the water tank 7 corresponding in level thereto, there are respectively provided a branch supply pipe 8B and an electromagnetic valve 8C opened or closed to control the amount of the cleaning water to be supplied to each branch supply pipe 8B.

Similarly, the liquid exhaust mechanism 9 includes a main water exhaust pipe 9A which extends vertically along the other side plate 1E of the framework 1. At each of three positions of the main water exhaust pipe 9A downwardly displaced from the attaching position of the water tank 7 corresponding in level thereto, there are respectively provided a branch exhaust pipe 9B and an electromagnetic valve 9C opened or closed to control the amount of the exhaust water from each branch exhaust pipe 9B to the main exhaust pipe 9A.

The electromagnetic valves 8C of the liquid supply mechanism 8 and the electromagnetic valves 9C of the liquid exhaust mechanism 9 are timer-controlled by means of an unillustrated controller. More particularly, in the case of a water supplying operation, each electromagnetic valve 8C of the liquid supply mechanism 8 is opened for a predetermined time period while each electromagnetic valve 9C of the liquid exhaust mechanism 9 is maintained under a closed condition, whereby a predetermined amount of cleaning water is supplied into each water tank 7. Further, after the lapse of the predetermined time period from the initiation of the water supplying operation, the respective electromagnetic valve 9C of the liquid exhaust mechanism 9 is opened so as to exhaust the water in each water tank 7 together with the animal excreta, animal feed residue or the like to an unillustrated waste water processing unit.

Then, at the timing when the water of the tank 7 has been exhausted or at an earlier timing, the respective electromagnetic valve 8C of the liquid supply mechanism 8 is opened for a predetermined time period to supply clean flushing water to the respective tank 7 to clean this tank 7. Then, into this cleaned water tank 7, a predetermined amount of new water is supplied to be reserved therein.

Next, the construction of each animal rearing cage S will be described in details.

As shown in FIGS. 4 through 9, four side plates, namely, a front plate 15, a rear plate 16 and a pair of right and left side plates 17 are rendered detachable relative to one another. At the bottom of the animal rearing cage S, there are disposed a pair of metal duckboards 14 on the front side and the rear side, respectively, and also a portion of the water tank 7 as one example of an excreta collecting portion for receiving and collecting e.g. the animal excreta dropped through the openings of the duckboards 14, 14. The ceiling side of the animal rearing cage S is sectioned by either the top plate 1A attached to the top of the framework 1 or a bottom wall 7a of the water tank 7 belonging to the upper-stage cage.

The top plate 7A or an attachment frame 1F disposed at a position corresponding in level to the ceiling area of the animal rearing cage S includes engaging portions 19, to which respective engaged portions 18 provided at the upper portion of the respective side plates 15, 16 are engaged for suspending the front plate 15 and the rear plate 16 between the pair of right and left side plates 17. Further, the top plate 1A or the attachment frame 1F includes contact restricting portions 20 for coming into contact with each side plate 15, 16, 17 as pivoted in the direction away from the animal rearing cage S, thereby to restrict this pivotal movement. The opposite pivotal movement of the respective side plates 15, 16, 17 in the direction toward the center of the animal rearing cage S is restricted by means of contact against the duckboards 14 and the pair of side plates 15, 16 opposed to each other in the front-rear direction.

The lower ends of the respective side plates 15, 16, 17 when suspended from the engaging portions 19 are adapted to extend into the water tank 7.

The animal rearing cages S adjacent to each other in the right and left direction are sectioned from each other by means of the single side plate 17.

The front plate 15 includes a rectangular ring-shaped metal frame 15A made of metal material such as stainless steel and having a lower end 15a thereof bent rearwardly and downwardly, and a front door 15B made of transparent vinyl chloride (synthetic resin) and having an opening 15c into which a feeding tool 22 is inserted. One lateral side end of the front door 15B is attached to the rectangular ring-shaped frame 15A via a pair of upper and lower hinges 23 vertically withdrawable from the rectangular frame 15A, so that that the front door 15B is detachable from the frame 15A along the vertical direction. On the other lateral side end of the front door 15B, there are attached engaging elements 25 which come into engagement with a pair of upper and lower receiver elements 24 attached to the rectangular ring-shaped frame 15A. Further, at the center of the front face of the front door 1, there is attached an engaging projection 21 for detachably retaining the feeding tool 22.

The rectangular ring-shaped frame 15A has a diagonal size slightly larger than the lateral width of the duckboards 14 so as to allow withdrawal of these duckboards 14 to the outside of the cage when the front door 15B is opened.

Figure 9:
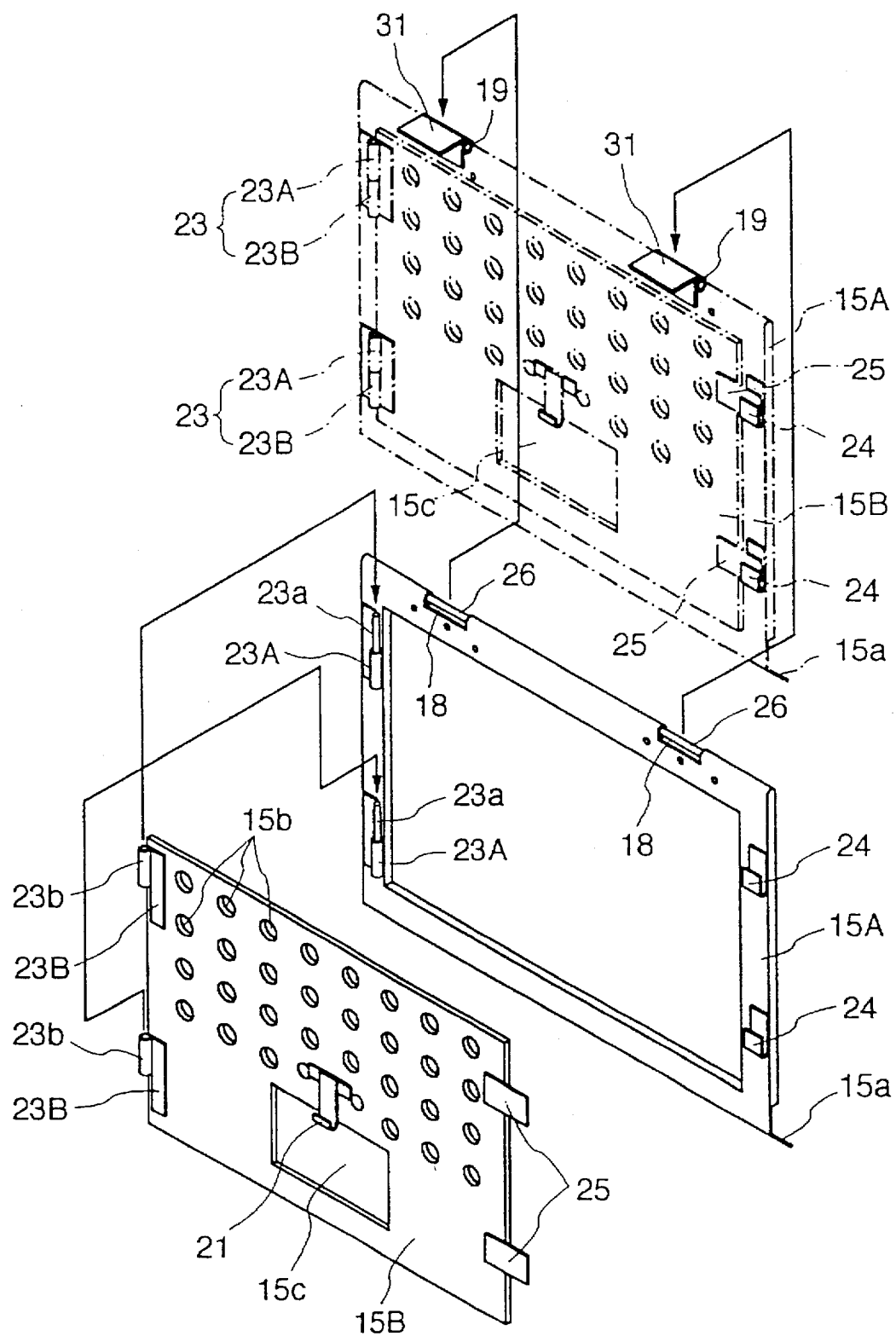
FIG. 9 is an exploded perspective view of a front plate.

Each hinge 23, as shown in FIG. 9, includes a split hinge member 23A fixedly attached to the rectangular frame 15A with a pivot shaft 23a thereof projecting upwards and a mating split hinge member 23B fixedly attached to the front door 15B and having a pivot cylinder 23b which is fitted onto the pivot shaft 23a from above.

Each of the rear plate 16 and the right and left side plates 17 is formed of thermoplastic resin material, and to an upper side of each of these plates there is attached a reinforcing plate 27 made of metal material such as stainless steel.

The rear plate 16 defines a plurality of air exhaust holes 16a for allowing air introduced into the animal rearing cage S through ventilation holes 15b of the front door 15B to be exhausted to the air exhaust duct 3 provided inside the duct cover 2, and this rear plate 16 defines also an attachment hole 16b into which a water feeding nozzle 29 for the animal is inserted. The water feeding nozzle 29 is connected with a water supply pipe 30 which is extended through the air exhaust duct 3 inside the duct cover 2.

Rectangular recesses are defined as cutouts at two longitudinally spaced positions at the upper end of the rectangular frame 15A and at two longitudinally spaced positions at the upper end of each of the reinforcing plates 27, respectively. At each of these recesses, a bar element 26 formed of metal material such as stainless steel is attached so as to transverse this recess and to be fixed thereto by means of appropriate fixing means such as caulking or welding. Further, a through hole is formed between the recess of the rectangular frame 15A and the bar element 26 and between the recess of the reinforcing plate 27 and the bar element 26, respectively. These through holes constitute the engaged portions 18 described hereinbefore.

Figure 7A:
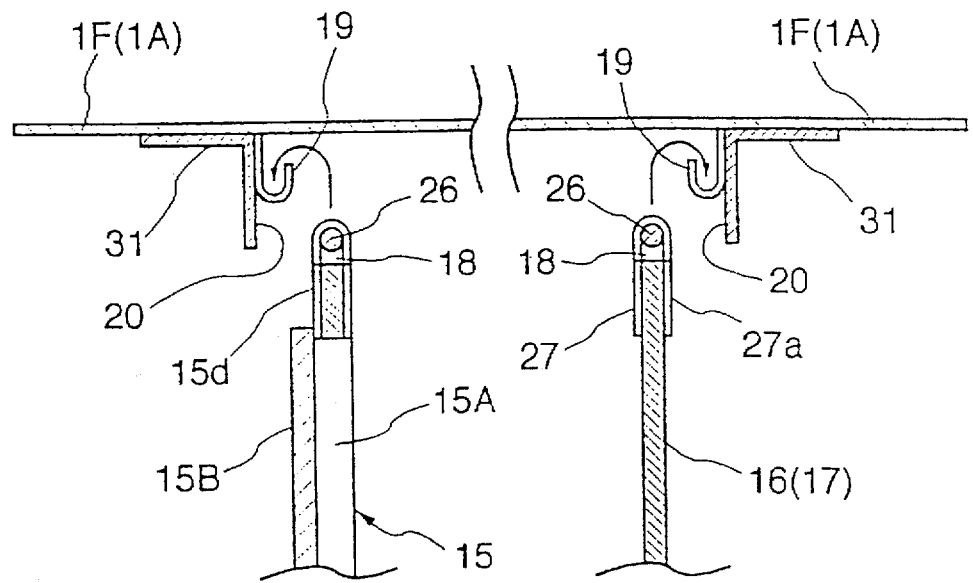
FIG. 7(a) is an enlarged section view of the principal portions before suspending attachment of the side plates.
Figure 7B:
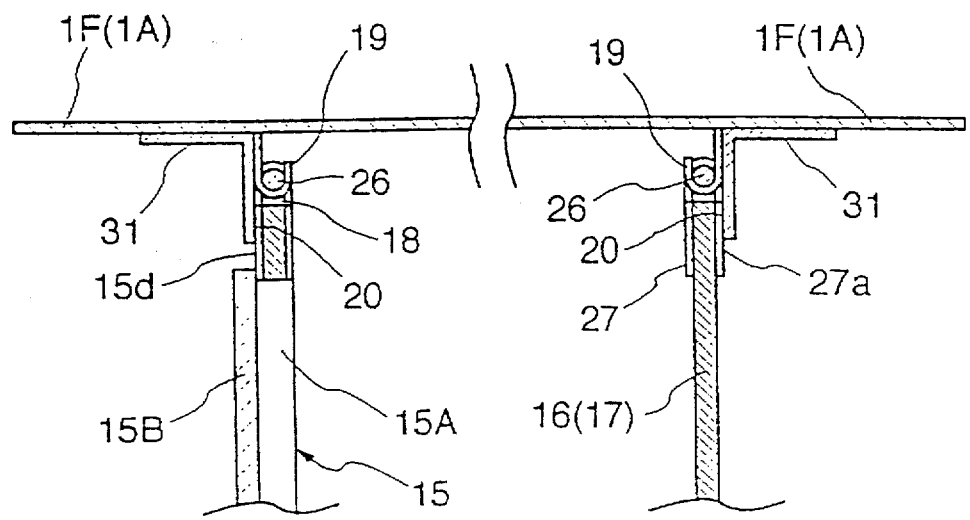
FIG. 7(b) is an enlarged section view of the principal portions when the suspending attachment of the side plates has been completed.

Each of the engaging portions 19, as shown in FIGS. 7(a) and 7(b), is constructed as a hook-like projection engageable into the through hole 18 and projection, i.e. the engaging portion 19 is fixed to an angle member 31 attached to the top plate 1A or the attaching frame 1F.

The contact restricting portion 20 is constructed from one side of the angle member 31 which comes into contact with one side face 15d of the rectangular frame 15A or one side face 27a of the reinforcing plate 27.

Figure 5:
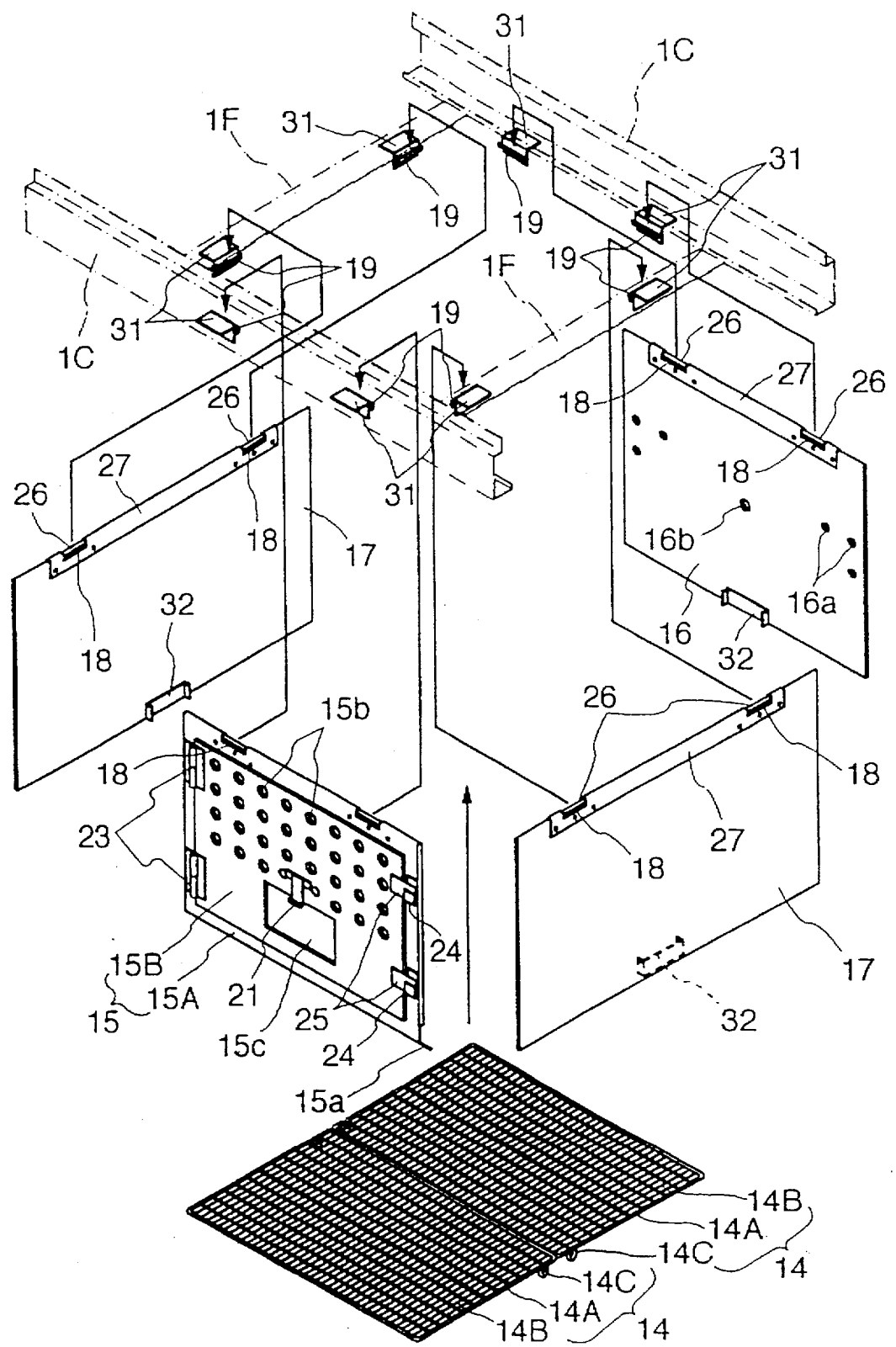
FIG. 5 is an exploded perspective view of various members together constituting an animal rearing cage.
Figure 6:
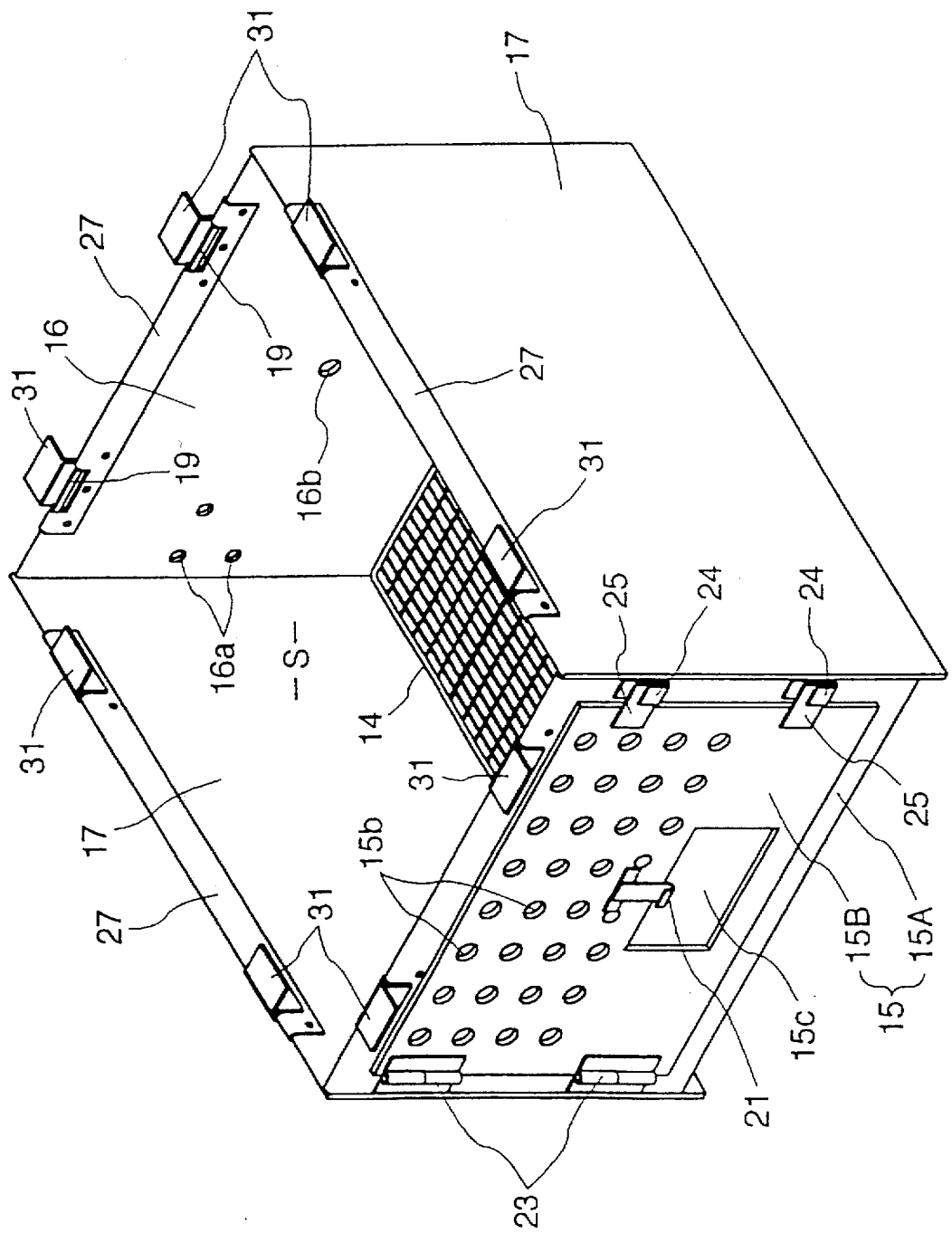
FIG. 6 is a perspective view showing an assembled condition of side plates and duckboards within a framework.
Figure 8A:
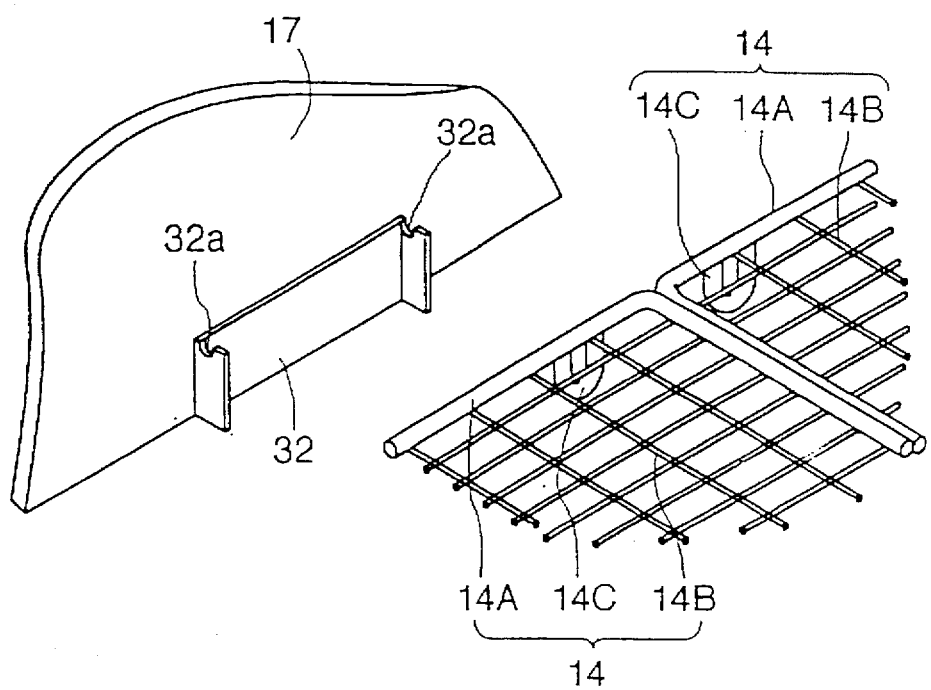
FIG. 8(a) is an enlarged section view before the duckboards are attached.
Figure 8B:
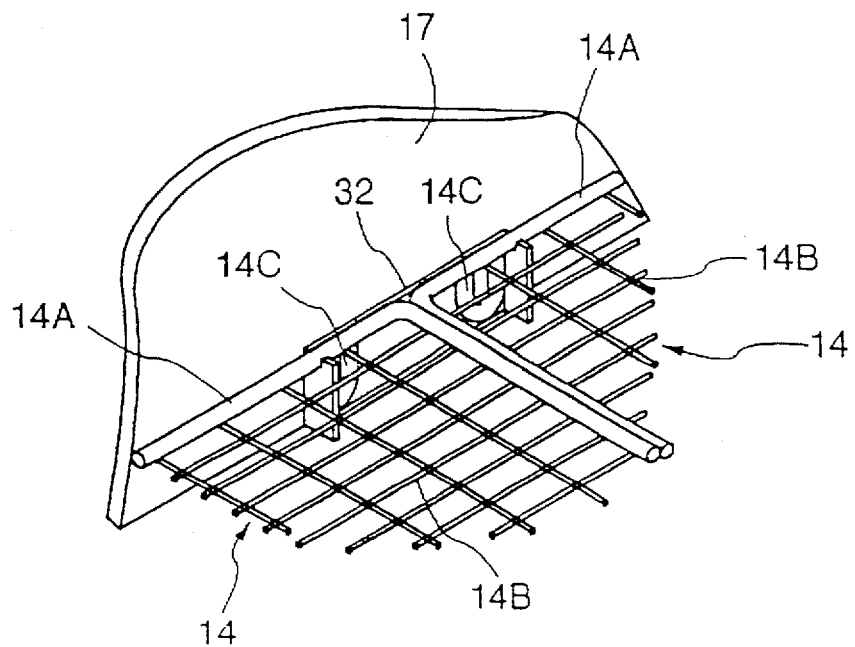
FIG. 8(b) is an enlarged section view when the duckboards have been attached.

Each of the duckboards 14, as shown in FIG. 5 and FIGS. 8(a) and (b), includes a frame member 14A formed by bending a metal wire into a rectangular shape, a mesh member 14B made of metal wire and attached as a grid to the frame member 14A, and a substantially U-shaped retainer projection 14C projecting downward in the vicinity of one end of the frame 14A in the forward and rearward direction.

Each of the side plates 15, 16, 17 includes, at a lower portion thereof, a support portion for supporting the bottom plate 14 thereon. More particularly, at the longitudinal center of the respective lower end of the side plates 15, 16, 17, there is provided a first support member 32 having a substantially C-shaped configuration in plan view and having an engaging recess 32a on which the frame member 14A of the duckboard 14 is detachably placed from above. And, a bent lower portion 15a of the rectangular frame 15A is adapted to act also as another support member for supporting thereon the frame member 14A of the duckboard 14 disposed on the front side.

Figure 4:
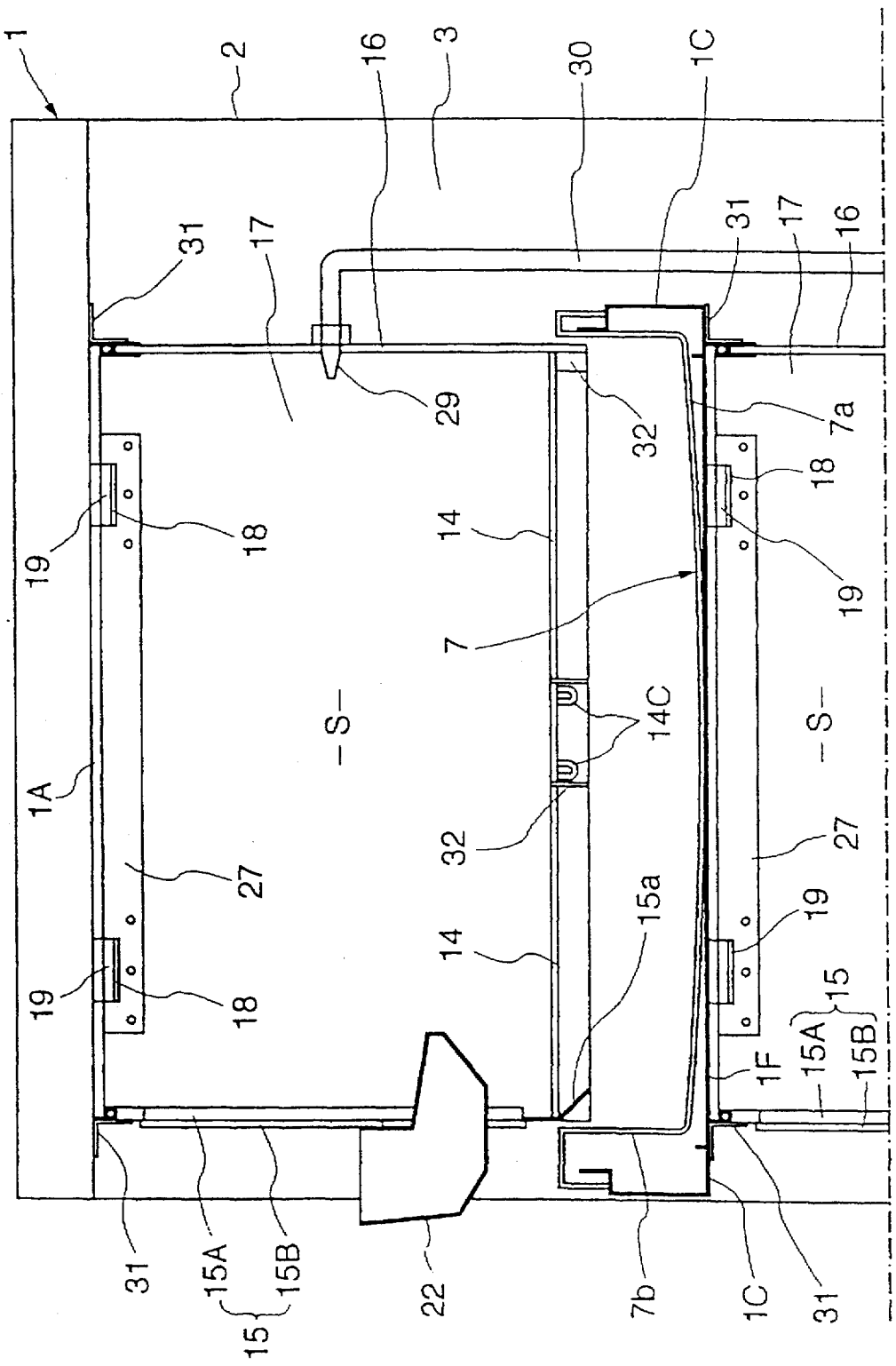
FIG. 4 is an enlarged section view showing principal portions of the apparatus.

As shown in FIG. 4, the front-rear inside width of the water tank 7 is slightly longer than a distance between the front face of the front plate 15 to the rear face of the rear plate 16, so as to inhibit a direct viewing into the water tank 7 through between the front face of the lower end of the front plate 15 and the side wall 7b of this water tank 7 opposed thereto in the forward and rearward direction.

[second embodiment]

Figure 10:
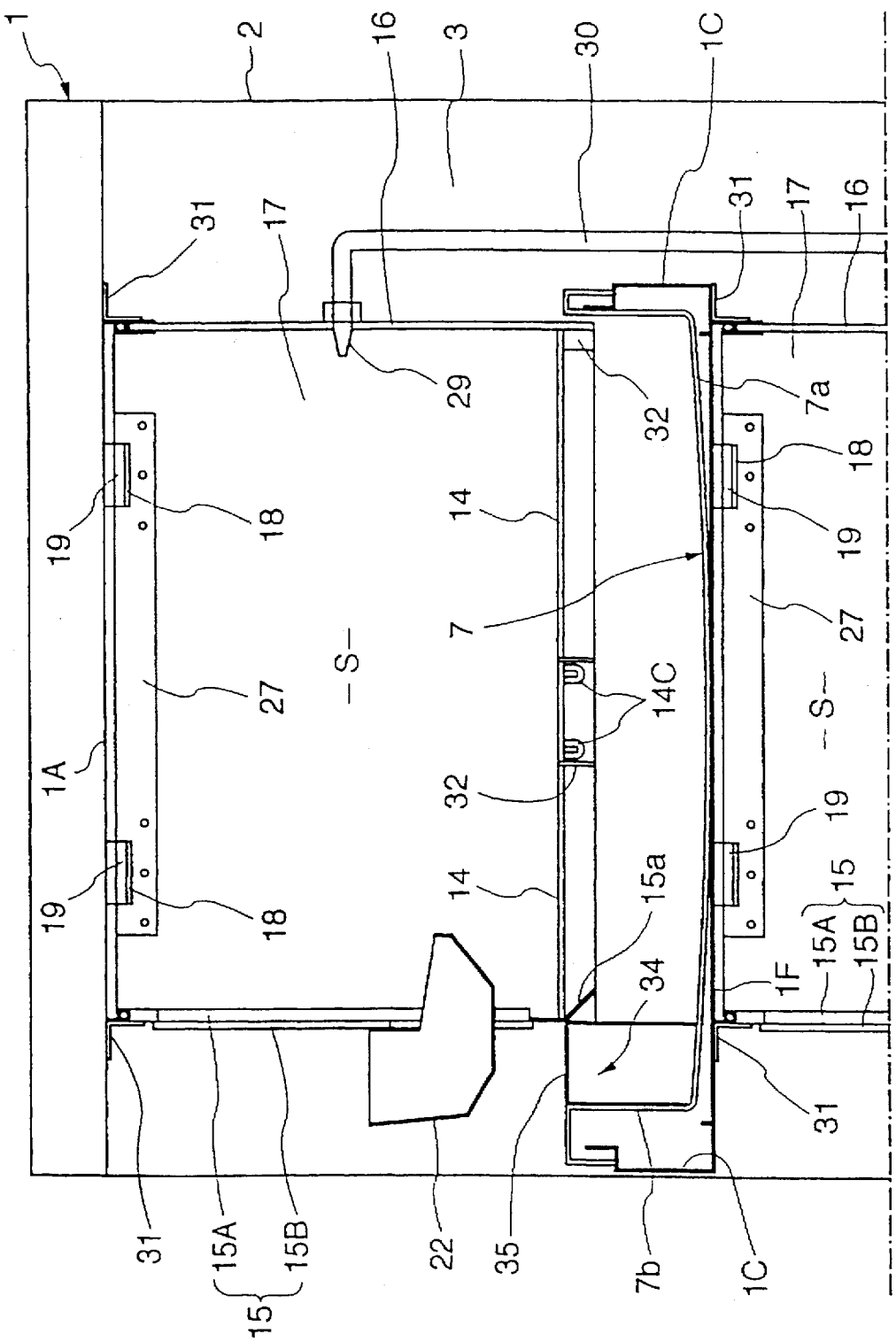
FIG. 10 is an enlarged section view showing principal portions of an animal rearing apparatus relating to a second preferred embodiment of the invention.

With an animal rearing apparatus according to a second embodiment, as shown in FIG. 10, the front-rear inside width of the water tank 7 is sized to be longer than the distance between the front face of the front plate 15 and the rear face of the rear plate 16. And, between the front face at the lower end of the front plate 15 and the side wall 7b of the water tank 7 opposed thereto in the front-rear direction, there is formed a checking/cleaning opening 34 for allowing visual inspection of the inside condition of the water tank 7 from the outside the cage and allowing also insertion of a cleaning tool therethrough. A substantially C-shaped lid 35 is detachably attached to the checking/cleaning opening 34 to be pivotable downwards.

The rest of the construction is identical to that of the first embodiment, and the identical members to those of the first embodiment are denoted with the same reference marks and numerals and will not be described here.

[third embodiment]

Figure 11:
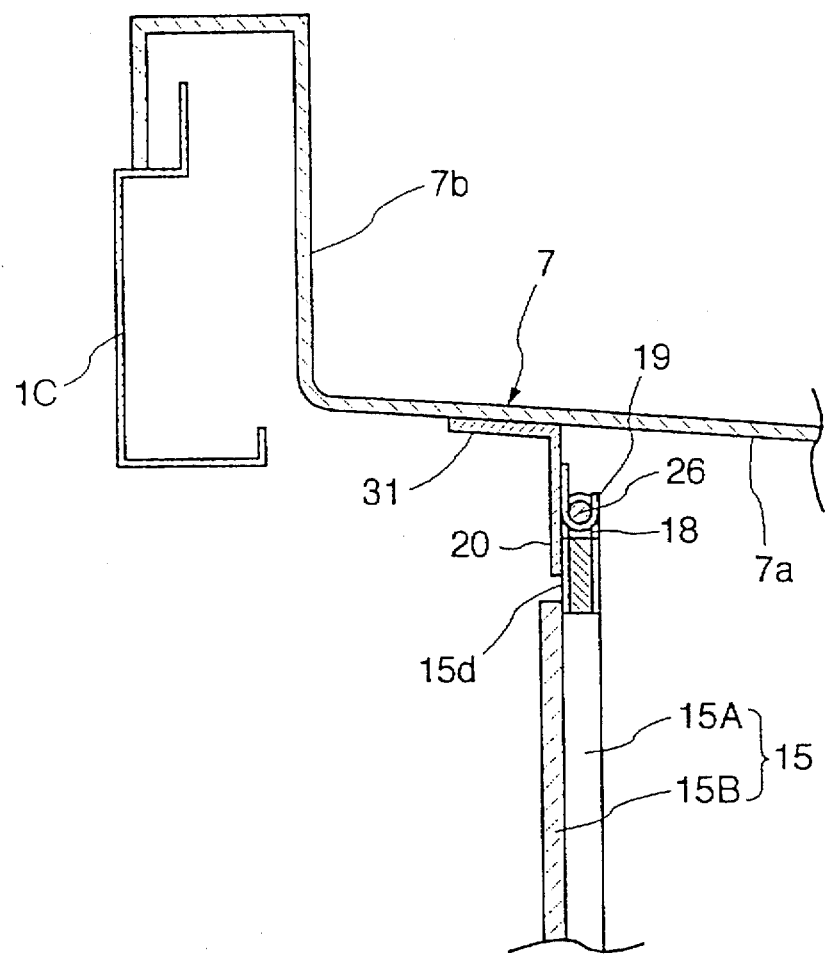
FIG. 11 is an enlarged section view showing principal portions of an animal rearing apparatus relating to a third preferred embodiment of the invention.

In the case of an animal rearing apparatus relating to this third embodiment, as shown in FIG. 11, an angle member 31 having the hook-shaped engaging projection 19 and the contact restricting portion 20 is attached to the bottom wall 7a of the water tank 7 disposed at the position corresponding to the ceiling of the lower-stage animal rearing cage S.

The rest of the construction of this embodiment is identical to that of the first embodiment and the identical members to those of the first embodiment are denoted with the same reference marks and numerals and will not be described here.

[fourth embodiment]

Figure 12:
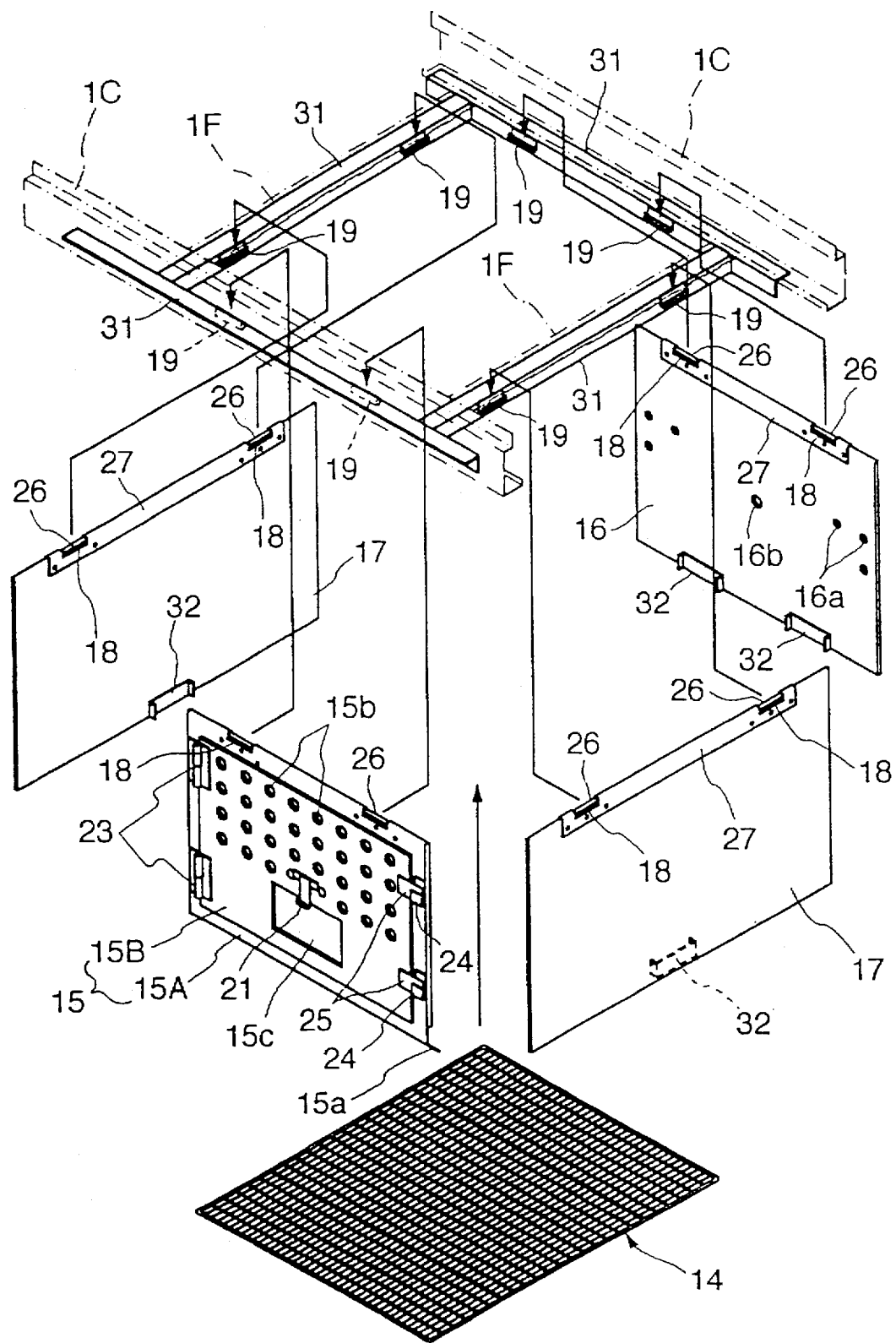
FIG. 12 is an exploded perspective view showing members constituting an animal rearing apparatus relating to a fourth preferred embodiment of the invention.
Figure 13:
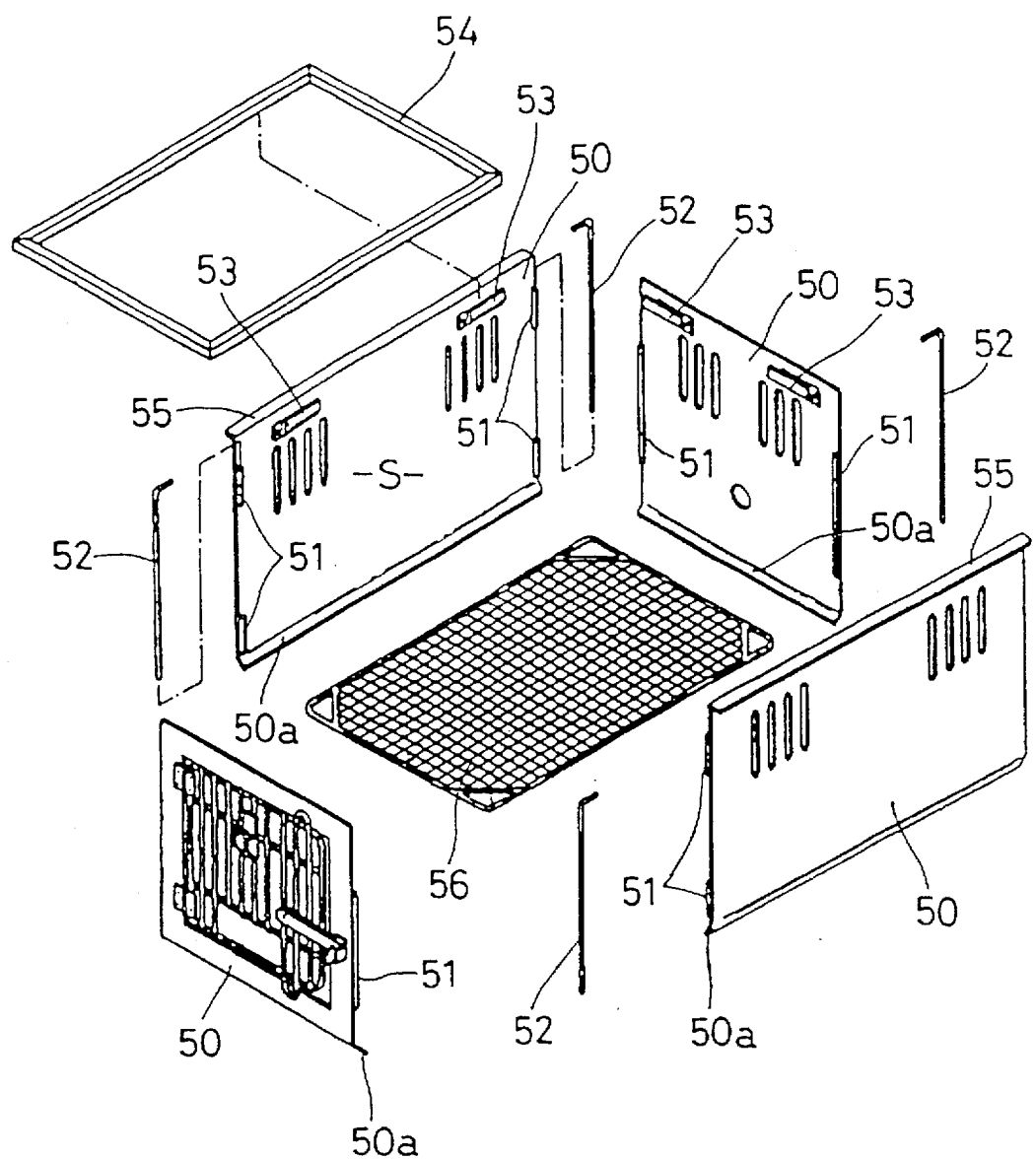
FIG. 13 is an exploded perspective view showing a conventional animal rearing apparatus.
Figure 14:
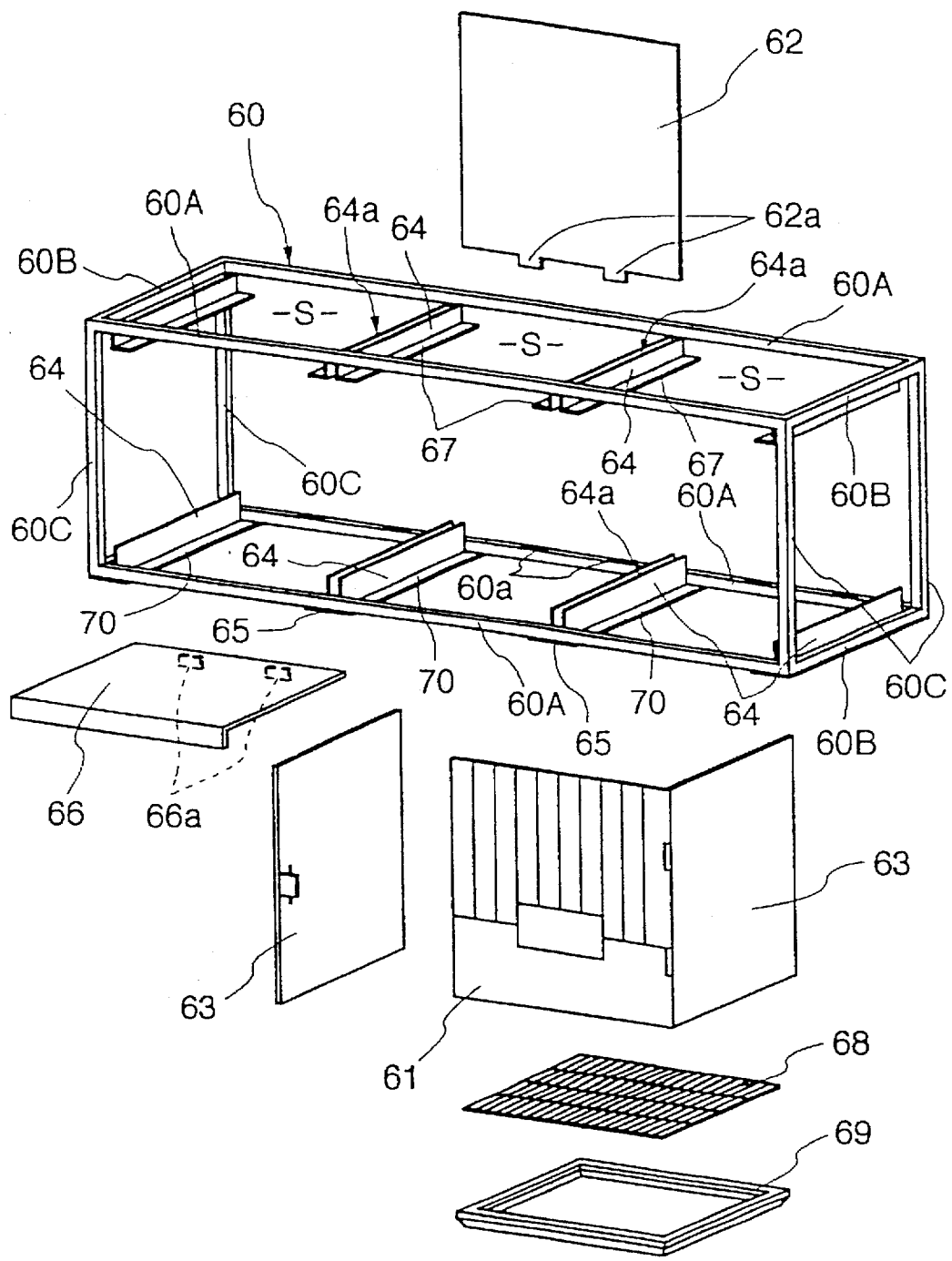
FIG. 14 is an exploded perspective view showing another conventional animal rearing apparatus.

In the case of an animal rearing apparatus relating to this embodiment, as shown in FIG. 12, the angle member 31 is formed as an elongate member and this elongate angle member is attached along the attachment frame 1F. And the hook-like engaging projections 19 are secured to the angle member 31.

Accordingly, the front, rear and side plates may be suspended by the engaging projections. As the angle member 31 is formed as an elongate member, it becomes easier to determine the attaching position of the angle member when this is attached to the attachment frame.

Incidentally, the rear plate in FIG. 12 includes the substantially C-shaped support members 32 at two positions for detachably engaging a single duckboard 14. Instead, only one support member at one position may be provided, as shown in FIG. 5.

[other embodiments]

(1) In the foregoing embodiments, a pair of front and rear duckboards 14 or a single duckboard 14 sized to correspond to the two separate duckboards combined is employed. The material forming these duckboards is not specifically limited. For instance, the duckboard may be formed of resin material instead of metal material.

Instead of the mesh type duckboards disclosed above, duckboards may be formed of punching metal.

In short, the material and shape of the duckboards are not particularly limited in the present invention as long as they are provided as the detachable bottom plate 14 defining a plurality of openings through which the excreta of animals or the like may be dropped to be exhausted.

(2) In the foregoing embodiments, the water tank is employed as the excreta collecting portion 7 for receiving and collecting animal excreta or the like dropped through the openings of the bottom plate 14. The specific construction of the excreta collecting portion 7 is not limited thereto, but may be a container capable of accommodating therein highly liquid or water-absorbent paper or cloth, or liquid or water-absorbent polymer or the like.

(3) In the foregoing embodiments, the pivotal movement of the respective side plates 15, 16, 17 suspended from the engaged portion 19 toward the center of the animal rearing cage S is restricted by the contact against the bottom plate 14 as well as the contact against the opposing side plate 15, 16. Instead, the movement may be restricted by the contact against the bottom plate 14 alone.

(4) In the foregoing embodiments, the contact restricting portion 20 for restricting, through contact, the pivotal movement of the respective side plate 15, 16, 17 suspended from the engaging portion 19 in the direction away from the animal rearing cage S is provided to either the top plate 1A or the attachment frame 1F disposed at the position corresponding in level to the ceiling of the animal rearing cage S. Instead, this contact restricting portion 20 may be provided to any further member constituting the framework 1 disposed adjacent the bottom of the animal rearing cage S or any attachment to be attached to the framework 1, such as the water tank 7 or a piping thereof.

(5) In the foregoing embodiments, the engaging portion 19 for engaging and suspending the respective side plate 15, 16, 17 is provided to either the top plate 1A or the attachment frame 1F disposed at the position corresponding in level to the ceiling of the animal rearing cage S. Instead, this engaging portion 19 may be provided to any attachment to be attached to the framework 1, such as the water tank 7 or the piping thereof.

(6) In the foregoing embodiments, each of the side plates 15, 16, 17 includes the support portion for detachably supporting thereon the bottom plate 14. Instead, these support portions capable of stably and detachably supporting the bottom plate 14 thereon may be provided only to at least the lower portions of the laterally opposing side plates 17 or the other side plates 15, 16 opposing to each other in the front and rear direction.

(7) In the foregoing embodiments, the laboratory animals comprise rabbits. Instead, the apparatus of the invention may be used for rearing of any other animal such as rats, dogs, cats or the like.

(8) The specific shape and number or the like of the engaged portions 18 provided at the upper portions of the respective side plates 15, 16, 17 and of the engaging portions 19 provided to the framework 1 or the attachment thereof may vary as desired.

(9) The work table 11 shown in FIGS. 1 through 3 is not essential. Any different structure may be provided, if necessary, with consideration to the height.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An animal rearing apparatus comprising:

an animal rearing cage;

framework to which a plurality of side plates together forming the periphery of the animal rearing cage are detachably attached;

wherein, at the bottom of the animal rearing cave, there are provided a bottom plate detachably attached thereto and defining a plurality of openings vertically extending therethrough and an excreta collecting portion for receiving and collecting animal excreta dropped through the openings of the bottom plate, the animal rearing cage having a ceiling thereof sectioned by a top plate or the excreta collecting portion belonging to an animal rearing cage on the upper stage;

the framework or an attachment member thereof includes, at portions thereof corresponding in level to the ceiling of the animal rearing cage, engaging portions for detachably engaging and suspending engaged portions provided at upper portions of the respective side plates;

wherein the framework or the attachment member thereof includes a contact restricting portion for restricting, through contact, a pivotal movement of each side plate suspended from the engaging portion in a direction away from the animal rearing cage, and a pivotal movement of the side plate in the opposite direction toward the center of the animal rearing cage is restricted by contact between this side plate and the bottom plate or by contact between the other side plate opposed to said side plate and the bottom plate.

2. An animal rearing apparatus as defined in claim 1, wherein the excreta collecting portion is a liquid tank, and the lower end of the respective side plate suspended from the respective engaging portion extends into the liquid tank.

3. An animal rearing apparatus as defined in claim 2, further comprising a cleaning-liquid supply mechanism for supplying cleaning liquid into the liquid tank and a cleaning-liquid exhaust mechanism for exhausting the used liquid from the inside of the liquid tank to the outside.

4. An animal rearing apparatus as defined in claim 2, wherein a checking/cleaning opening is provided between the lower end of the front side plate and a side wall of the liquid tank opposing thereto in the front-rear direction, and a lid is detachably attached to the checking/cleaning opening.

5. An animal rearing apparatus as defined in claim 4, wherein said lid is substantially C-shaped and attached to the checking/cleaning opening to be pivotable downwards.

6. An animal rearing apparatus as defined in claim 1, wherein each of at least one opposing pair of the side plates includes, at a lower portion thereof, a support portion for detachably supporting the bottom plate thereon;

the entire or at least portions of the respective side plates are formed of synthetic resin material and the engaged portions are formed of metal material;

the framework includes a plurality of animal rearing cages sectioned from one another at least in lateral direction, and adjacent cages adjacent each other in the lateral direction are sectioned from each other by a single side plate shared by these cages;

the excreta collecting portion is a liquid tank, and the lower end of the respective side plate suspended from the respective engaging portion extends into the liquid tank; and said each engaged portion provided to the respective side plate is a through hole, while said each engaging portion provided at the position corresponding in level to the ceiling is an engaging projection engageable into the through hole.

7. An animal rearing apparatus as defined in claim 2, wherein said engaging portions and said contact restricting portion are provided to an angle member which is attached to a bottom wall of the excreta collecting portion disposed at the position corresponding in level to the ceiling of the animal rearing cage.

8. An animal rearing apparatus comprising:

an animal rearing cage;

a framework to which a plurality of side plates together forming the periphery of the animal rearing cage are detachably attached;

wherein, at the bottom of the animal rearing cage, there are provided a bottom plate detachably attached thereto and defining a plurality of openings vertically extending therethrough and an excreta collecting portion for receiving and collecting animal excreta dropped through the openings of the bottom plate, the animal rearing cage having a ceiling thereof sectioned by a top plate or the excreta collecting portion belonging to an animal rearing cage on the upper stage;

the framework or an attachment member thereof includes, at portions thereof corresponding in level to the ceiling of the animal rearing cage, engaging portions for detachably engaging and suspending engaged portions provided at upper portions of the respective side plates;

wherein said each engaged portion provided to the respective side plate is a through hole, while said each engaging portion provided at the position corresponding in level to the ceiling is an engaging projection engageable into the through hole.

9. An animal rearing apparatus as defined in claim 8, wherein each of at least one opposing pair of the side plates includes, at a lower portion thereof, a support portion for detachably supporting the bottom plate thereon.

10. An animal rearing apparatus as defined in claim 9, wherein the entire or at least portions of the respective side plates are formed of synthetic resin material and the engaged portions are formed of metal material.

11. An animal rearing apparatus as defined in claim 9, wherein the lower portion of a front side plate is bent toward the animal rearing cage so as to provide the support portion for detachably supporting the bottom plate thereon.

* * * * *

UNITED STATES PATENT AND TRADEMARK OFFICE
CERTIFICATE OF CORRECTION

PATENT NO. : 5,749,321
DATED : May 12, 1998
INVENTOR(S) : Toshimi Ikuse et al.

It is certified that error appears in the above-identified patent and that said Letters Patent is hereby corrected as shown below:

Title Page, under [56] References Cited, U.S. PATENT DOCUMENTS, insert:
```
  --1,840,202  1/1932   Kerr................119/458
    3,159,139 12/1964   Haggard et al.......119/458x
    3,269,358  8/1966   Hawley..............119/458x
    3,381,664  5/1968   Barlocci............119/474
    3,429,297  2/1969   Schroer.............119/417
    3,822,673  7/1974   Benny...............119/458
    3,896,768  7/1975   Galloway............119/458
    3,978,819  9/1976   Lovitt..............119/458
    3,990,398 11/1976   Davis, Jr...........119/480--.
```

Column 1 Line 60 between "63-25981)." and "(b)" insert paragraph.

Column 10 Lines 18 "frame IF" should read --frame 1F--.

Claim 1 Column 12 Line 46 "cave" should read --cage--.

Claim 7 Column 13 Line 44 "defined in claim 2" should read --defined in claim 1--.

Signed and Sealed this

Twentieth Day of October, 1998

*Attest:*

BRUCE LEHMAN

*Attesting Officer*   Commissioner of Patents and Trademarks